(12) United States Patent
Fuentes-Torres

(10) Patent No.: US 7,542,935 B2
(45) Date of Patent: Jun. 2, 2009

(54) METHOD AND SYSTEM FOR INTEGRATING SAVINGS AND CREDITS WITH DIFFERENT INTEREST RATES

(75) Inventor: Andres Fuentes-Torres, Santiago (CL)

(73) Assignee: Sciac Investment Ltd, Santiago (CL)

( * ) Notice: Subject to any disclaimer, the term of this patent is extended or adjusted under 35 U.S.C. 154(b) by 686 days.

(21) Appl. No.: 11/160,554

(22) Filed: Jun. 28, 2005

(65) Prior Publication Data
US 2005/0240521 A1 Oct. 27, 2005

(51) Int. Cl.
*G06Q 40/00* (2006.01)
(52) U.S. Cl. ............................. 705/35; 705/38; 705/39
(58) Field of Classification Search ................... 705/35, 705/38, 39
See application file for complete search history.

(56) References Cited

U.S. PATENT DOCUMENTS

| | | | | |
|---|---|---|---|---|
| 5,949,044 | A | * | 9/1999 | Walker et al. ................ 235/379 |
| 6,131,810 | A | * | 10/2000 | Weiss et al. .................... 705/42 |
| 2003/0009402 | A1 | | 1/2003 | Mullen |
| 2003/0028478 | A1 | * | 2/2003 | Kinney et al. .................. 705/38 |

OTHER PUBLICATIONS

AT&T Sues Ebay and Paypal (for patent infringement), Nov. 28, 2003, CardLine, v 3, n 48, p. 1.*
Beyond digital wallets: Internet payment services as Ecommerce boom or bust, Sharon Gwyn Short, EContent; Apr./May 2000; 23, 2; ABI/INFORM Global, p. 31-32 and 34-36.*
Ringing up sales on the Internet, Pat Ryan, InfoWorld; Dec. 8, 1997; 19, 49; ABI/INFORM Global, p. 87 and 92.*
The road ahead: Banking and technology, Jensen, Edmund P, Credit World; Jul./Aug. 1995; 83, 6; ABI/INFORM Global, p. 24-27.*
Digital Cash Pioneer Promoting Universal Card Payments System, American Banker, Oct. 29, 1999, p. 1-3.*
IPER with Written Opinion mailed Jul. 24, 2008; Sciac Investment Ltda. International Application No. PCT/US2006/024482 filed Jun. 23, 2006.

* cited by examiner

*Primary Examiner*—Alexander Kalinowski
*Assistant Examiner*—Gregory Johnson
(74) *Attorney, Agent, or Firm*—Knobbe Martens Olson & Bear LLP

(57) ABSTRACT

A method and system for operating a new financial instrument and payment card integrates savings and credit transactions belonging to the same payment plan into a single account. Transactions can be carried out at different periods in time, for any amount, agreed on with different fixed or adjustable interest rates, without losing the payment conditions of each savings and credit. A financial account card as a financial instrument can be used to carry out long, medium and short-term savings and credit financial transactions. The card can also be used as a payment card to buy and sell anything of value. The card is operated through financial institutions and service centers by a computer system, which manages transactions between cardholders themselves and with financial institutions, maintains account balances, determines installments for debt and savings balances, manages available credit limits and guarantees, and manages other financial and payment services.

20 Claims, 5 Drawing Sheets

Sciac Cardholders and Financial Transactions

Fig. 1 Convention for Cycles and Subscription of Parameters

Fig. 4 Balance of a Sciac Account after a Financial Transaction $V_N$: Nominal value of the financial transaction in the Sciac Voucher

METHOD AND SYSTEM FOR INTEGRATING SAVINGS AND CREDITS WITH DIFFERENT INTEREST RATES

BACKGROUND

1. Field of the Invention

The field of this invention includes all kinds of financial instruments that allow persons (individuals and organizations) to carry out savings, obtain credits or loans, and the corresponding account systems and methods of financial mathematics. Other financial instruments different from savings and credit instruments, for instance some derivatives such as futures and options, are not part of the field of this invention. Therefore the word "financial" in this document only refers to savings and credits.

This invention can be related to patents registered in Class 705 Subclasses 1, 16, 17, 18, 30, 33, 34, 35, 36R, 38, 39, 40, 41, 42, 43, 44, 45, Class 186 Subclass 37, Class 235 Subclasses 375, 379.

2. Description of the Related Art

Concepts of Financial Instruments

With regard to the capacity in integrating transactions into a single account, all financial instruments can be classified within of the Integrated Account Concept (IAC) or the Principal Operation Concept (POC). These concepts are defined to understand the differences between this invention and the existent financial instruments. These are similar to Open-End and Close-End credit concepts defined in the US Code of Federal Regulations in Title 12, but these also apply to savings instruments, and emphasize the capacity and flexibility in integrating several transactions in a single account, for which each one of these concepts has advantages and limitations.

The financial instruments designed under the Integrated Account Concept (IAC) are characterized by the fact that in their accounts several savings or credit transactions can be integrated into a single balance, as well as withdrawals of savings or payments of debt.

Typical IAC financial instruments are: savings accounts, credit cards, credit lines and revolving credits.

The financial instruments designed under the Principal Operation Concept (POC) are characterized by the fact that in their accounts one savings or credit principal transaction is entered into a single balance, and later, one or more withdrawals of savings or payments of debt are integrated into the account balance.

Typical POC financial instruments are: bills of exchange, time deposits, promissory notes, bonds, mortgage loans and certificates of deposit.

Depending on the particular conditions for each POC instrument, it is possible to carry out more financial transactions by endorsements, prepayments or refinancing. Therefore, POC instruments can also integrate more than one financial transaction; nevertheless, such a capacity to integrate multiple transactions has limitations which hinder the flexibility of this instrument.

IAC Financial Instruments

In general, IAC instruments are more modern than POC instruments, and when both are used in the same segment of the market, POC instruments tend to be substituted by IAC instruments. A good example of this is how credit cards have made bills of exchange obsolete in almost all commercial areas.

In summary, the main advantages of IAC over POC instruments are the following: a) IAC are more flexible than POC instruments, b) Operational costs per transaction are lower in IAC than in POC instruments, and c) IAC instruments allow the customer to be provided with a wider range of services than POC instruments.

In spite of their advantages, IAC instruments have some restrictions that have limited their use in some markets until now.

The first restriction is that the same nominal interest rate and interest cycle must be applied to all savings and credit transactions integrated into a single account balance.

As interest rates in the market can fluctuate at any time, all known IAC financial instruments allow the nominal interest rate applied to the balance (savings or debt) to vary according to the regulations of those instruments. There are IAC instruments that can change their nominal interest rate daily, monthly or quarterly. IAC instruments in which the nominal interest rate is kept fixed for longer is unusual.

The second restriction is that the same time conditions for payments and withdrawals must be applied to all savings and credit financial transactions integrated into a single account balance.

POC Financial Instruments

In spite of the outstanding advantages of the IAC instruments, in the long and medium-term markets the replacement of POC instruments has not been possible. In these markets, the POC instruments use fixed as well as adjustable nominal interest rates.

In summary, the main advantages of POC over IAC financial instruments are the following: a) They allow the nominal interest rate to be fixed for a long period of time, b) They allow different interest rates to be fixed per transaction according to market conditions, and c) They allow an array of payments to be defined (in amount and time) to pay for the principal.

Under certain conditions, POC instruments can also integrate more than one operation into a single account. In order to understand it, two different points of view will now be explained.

The first point of view to understand the integration in POC instruments is to treat all installments as operations similar to the principal, integrated into the account of the principal. So, the principal would be a credit until the account maturity date, and every installment would be considered a savings until the maturity date of the same account. When the account maturity date falls, the principal plus the interest is equal to the sum of each installment (savings) plus its interest. The result is the same whether every operation is carried out in separate accounts or in a single account. The result is also the same when the account maturity date is postponed for one or more cycles.

The second point of view to understand the integration in POC instruments is based on the fact that they can be integrated when the nominal interest rates, the account's maturity date and the payment profiles are identical. More precisely, when both payment profiles in the remaining term are identical but not necessarily for the same amounts. This operation is common in some mortgage loan accounts. In such a case a person can reduce his debt balance by carrying out an extraordinary amortization.

SUMMARY

The Sciac card, the financial instrument of this invention, has characteristics and advantages of both the Integrated Account Concept (IAC) and the Principal Operation Concept (POC) financial instruments. The Sciac card is essentially an IAC financial instrument, because of it allows the integration of several savings and credit transactions in a single account, but it also has characteristics of a POC financial instrument, since allows the Sciac cardholder to carry out savings and credit transactions with different effective interest rates, and since each savings and credit has a periodic payment arrangement, although it is common for all transactions, it is possible to define a particular payment arrangement for the Sciac account, in which the savings and credits are integrated.

This invention called Sciac™—an acronym that stands for Savings & Credits Integrated Account Concept—is a method (Sciac formula) and a system (Sciac system) to operate a new financial instrument and a payment card (Sciac card), which integrates savings and credit transactions belonging to the same payment plan into a single account, that can be carried out at different periods in time, for any amount, agreed on with different fixed or adjustable interest rates, without losing the payment conditions of each savings and credit.

The Sciac card as a financial instrument is designed to carry out long, medium and short-term savings and credit financial transactions and as a payment card to buy and sell any kind of value.

The Sciac system manages different payment plans, which are defined basically by the following parameters: the fixed amortization rate, the fixed or adjustable nominal interest rate, the payment cycle, the unit value of the accounts and in some cases the adjustment index.

Financial transactions with the Sciac card can only be carried out between two or more Sciac cardholders, who hold open Sciac accounts in any associated financial institution.

The Sciac account payment plan of the drawer (borrower) and the taker (saver) in a financial transaction have to be the same.

The Sciac card has characteristics and advantages of both the Integrated Account Concept (IAC) and the Principal Operation Concept (POC) financial instruments.

The purpose of this invention is to launch onto the market a simple and flexible financial instrument to carry out integratedly managed savings and credits, which can be used as a payment card in any kind of transaction. This new instrument is particularly useful in the long and medium-term financial markets for high and medium amount transactions. In comparison to the financial instruments used in these markets, the Sciac card is also simple and flexible to manage for financial and investment institutions.

The payment condition, the part of the Sciac formula that allows the integration of savings and credits belonging to the same payment plan into a single account, for any amount, carried out at different periods in time, is the amortization rate method, which consists in calculating the periodic amortization of an ordinary installment as a fixed percentage of the latest balance.

The transaction condition, the part of the Sciac formula that allows the integration of savings and credits belonging to the same payment plan into a single account, carried out with different fixed or adjustable effective interest rates and different to the fixed or adjustable nominal interest rate defined in the payment plan, is the application of the nominal value equivalent method, which consists in integrating into the account a nominal value of the savings and the credit, equivalent to the effective value of the transaction.

The nominal value of a financial transaction can be easily calculated and freely agreed on using the Sciac formula that relates a nominal value to an effective value, given the nominal interest rate and the amortization rate defined in the payment plan, as well as the effective interest rate agreed on taking into account information from the market.

The balance of each Sciac account, in which the savings and credits of the same payment plan are integrated, is amortized periodically by ordinary amortizations applying the amortization rate. Furthermore, the balance is amortized, partially or totally, by positive extraordinary amortizations, that consist of opposite financial transactions in relation to the balance, i.e. a savings transaction when there is a debt balance, and a credit transaction when there is a savings balance; which can be voluntary, agreed, minimal or compulsory.

Due to the amortization rate method, every savings and credit carried out with the Sciac card has an infinite term to maturity to pay its balance. However, the account balance has an indefinite term to maturity, which can be terminated by the financial institution or by the cardholder at any time, since it is possible to liquidate any savings or debt balance, by an opposite financial transaction or an extraordinary amortization carried out for the same amount as the savings or debt balance.

The Sciac cardholder can be any person, individual or organization, and can hold one or more Sciac accounts belonging to different long, medium and short-term payment plans.

The financial institution assumes the risks of unpaid debts for all Sciac accounts opened in its institution. Financial institutions must control and reduce this risk by managing guarantees, insurance policies and payment capacity of Sciac cardholders. Furthermore, the financial institution assumes the obligation to pay all installments of the Sciac accounts with a savings balance.

To obtain credit with the Sciac card it is necessary for the Sciac cardholder to have enough available credit limit, which is periodically determined for each Sciac account.

DETAILED DESCRIPTION

Definitions

Figure 1:
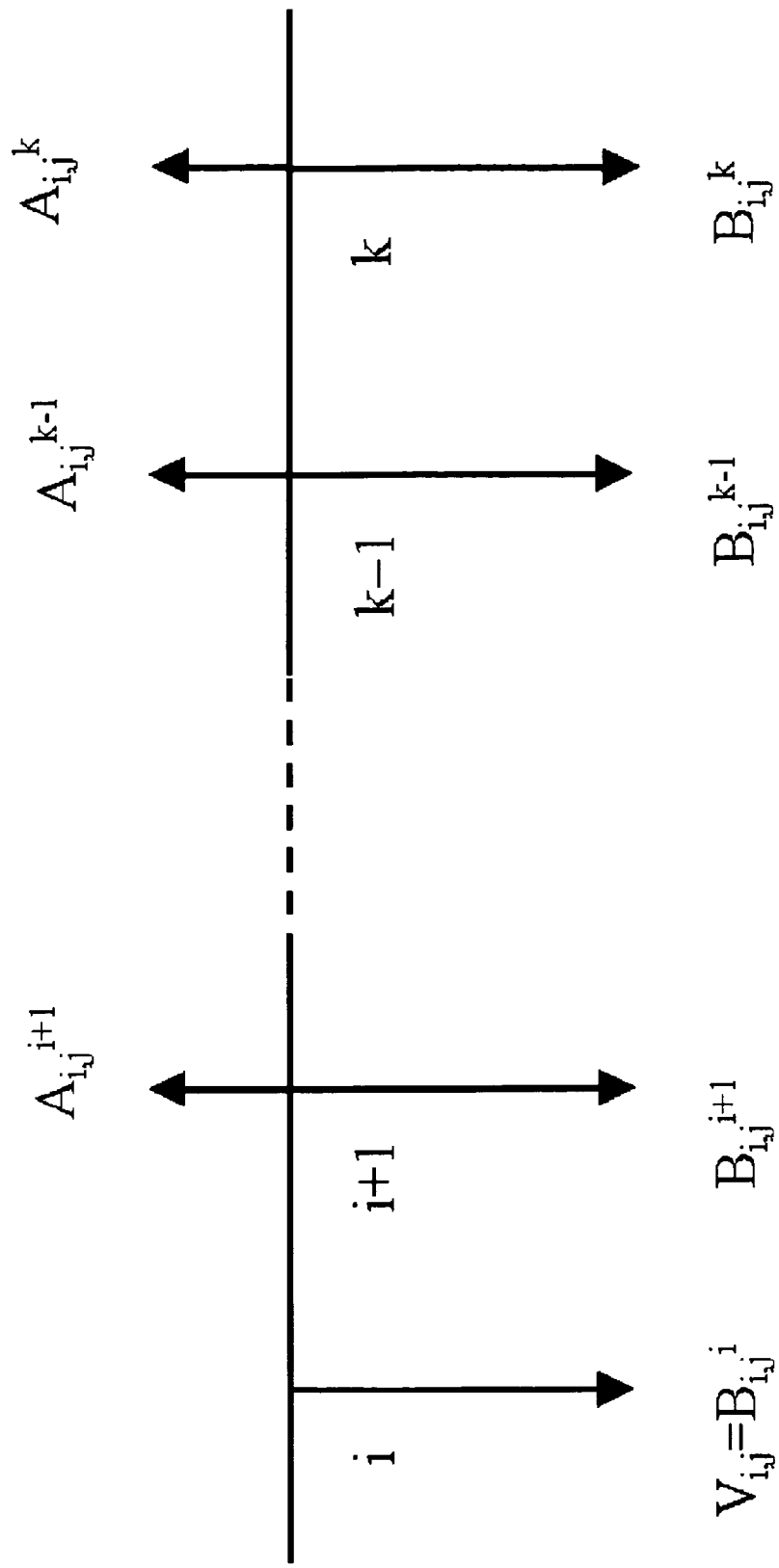
FIG. 1 shows a convention for cycles and subscription of parameters used in variables and mathematical expressions.

The principal concepts used in this invention are defined in the following list.

| Term | Definition |
| --- | --- |
| Effective Interest Rate: | The prevailing market ongoing interest rate for a financial transaction, that takes into account the payment conditions of the financial instrument. |
| Nominal Interest Rate: | The explicit interest rate used to calculate the interest of an account balance for each interest cycle. It can be fixed or adjustable. In Sciac, it is defined in the Sciac account payment plan. |
| Effective Value: | The cash value of a financial transaction. It is also the present value of the payment flow expressed in the unit value of the account, discounted using the effective interest rate of the market for the financial transaction. |

-continued

| Term | Definition |
|---|---|
| Nominal Value: | The face value or par value of a financial transaction, which is printed or filled out on the financial document used in the transaction. |
| Interest Cycle: | The regular time interval defined to calculate the interest to be paid or to be accumulated in the account balance. |
| Amortization Cycle: | The regular time interval defined to calculate the amortization that must be paid and subtracted from the account balance. |
| Payment Cycle or Cycle: | The regular time interval defined to pay either an amortization, or interest or both. In Sciac, the payment cycle, the interest cycle and the amortization cycle are the same regular time interval. The payment cycle is defined in the Sciac account payment plan. |
| Unit Value: | The unit used as a measurement of value of an account. It may be the currency unit of a country, a unit as a result of weighted currency units, or a special indexed unit defined in reference to a specific currency unit. The unit value is defined in the Sciac account payment plan. |
| Adjustment Index: | The index, such as the Consumer Price Index (CPI), used to adjust the balance for each cycle in order to maintain its value or adjust the equivalent quantity between the special unit value and the currency unit used as a basis. In Sciac, the adjustment index is defined in the Sciac account payment plan. |
| Amortization Rate: | The fixed percentage to be applied in every amortization cycle to the balance in order to calculate the ordinary amortization that must be paid. In Sciac, the amortization rate is defined in the Sciac account payment plan. |
| Term to Maturity: | The interval between the transaction date and the maturity date. |
| Account Deadline: | The limit date defined by the financial institution to maintain an account of a financial instrument open. |
| Maturity Date: | The date on which the balance corresponding to a financial account must be fully paid. |
| Transaction date: | The date on which the financial transaction is validated by the financial institutions involved in the transaction. This date can be the same as or later than the buying and selling operation date. |
| Deadline of the Cycle: | The last date of a payment cycle. |
| Payment Date: | The due date or the last date of payment for an installment corresponding to a debt balance or the date of payment of an installment corresponding to a savings balance. These dates are agreed on with the financial institution. |
| Cardholder: | A legal entity, individual (natural person) or organization (juridical person) which holds an open financial account that uses a card in its operation. |
| Credit: | Value, money or its equivalent, received by the borrower or drawer, and charged to his account creating or increasing a debt balance, decreasing or liquidating a savings balance, or changing a savings balance to a debt balance. |

-continued

| Term | Definition |
|---|---|
| Savings: | Value, money or its equivalent, given by the saver or taker, and credited to his account creating or increasing a savings balance, decreasing or liquidating a debt balance, or changing a debt balance to a savings balance. |
| Saver or Taker: | A person (individual or organization) who carries out savings when selling money or another value and receives a financial document in exchange in a financial transaction. |
| Borrower or Drawer: | A person (individual or organization) who obtains a credit when buying money or another value and gives a financial document in exchange in a financial transaction. |
| Financial Document: | A document used in a financial transaction, which represents a value by itself or is an order for a movement of a value in a financial account. The record of the document can be electronic, paper or both. |

A convention for cycles and subscription of parameters is used in variables and mathematical expressions and is set forth in FIG. 1. The subscript "i" identifies the cycle during which a savings or credit is carried out, and "j" the savings or credit carried out in the same cycle "i". The index "k" identifies any cycle.

Sciac Formula

The Sciac formula allows the integration of savings and credit transactions belonging to the same payment plan into a single account, which can be carried out at any period in time, for any amount, agreed on with different fixed or adjustable effective interest rates and different from the fixed or adjustable nominal interest rate defined in the Sciac account payment plan, without losing the payment conditions of each savings and credit.

The Sciac formula has two fundamental parts, the payment formula and the transaction formula, both of which must be applied to each savings and credit in order for them to be able to be integrated into a single Sciac account.

The amortization rate method is the payment formula that allows the integration of savings and credits that belong to the same payment plan into a single account, for any amount, carried out at any period in time. This method consists in calculating the periodic amortization of an ordinary installment as a fixed percentage of the latest balance. This percentage is defined in the Sciac account payment plan.

The equivalent nominal value method is the transaction formula that allows the integration of savings and credits that belong to the same payment plan into a single account carried out with different fixed or adjustable effective interest rates and different to the fixed or adjustable nominal interest rate defined in the payment plan. This method consists in integrating the nominal value of the savings and the credit in the corresponding accounts, equivalent to the effective value of the transaction.

A nominal value is considered equivalent to an effective value, when the installments of the nominal values calculated with the fixed or adjustable nominal interest rate defined in the payment plan are identical to the installments of the effective value calculated with the fixed or adjustable effective interest rate.

The Sciac account payment plans are defined by the followings parameters: the fixed amortization rate, the fixed or adjustable nominal interest rate, the payment cycle, the unit value of the account and, in some cases, by the adjustment index. Additionally, the payment plan defines whether or not the nominal interest rate is proportionally applied in the first cycle, between the transaction date and the deadline of the cycle.

Payment Formula of Savings and Credits

The balance of each Sciac account, in which the savings and credits of the same payment plan are integrated, is amortized periodically by ordinary amortizations applying the amortization rate. Also, the balance can be amortized, partially or totally, at any time by positive extraordinary amortizations, consisting of an opposite financial transaction with regard to the balance, which can be voluntary, agreed, minimal or compulsory.

Amortization Rate Method and Ordinary Amortizations

The amortization rate method consists in always calculating the periodic ordinary amortization of every nominal savings and credit $A_{N_i,j^k}$ as a fixed percentage P % of the latest nominal balance $B_{N_i,j^{k-1}}$ for every cycle "k".

$$A_{N_i,j^k} = P\% \cdot B_{N_i,j^{k-1}} \tag{1}$$

When integrating savings and credits of the same payment plan into a single balance, it is not possible to calculate the ordinary amortization of each savings and credit balance separately. Nevertheless, as the sum of the ordinary amortizations of each savings and credit balance in any cycle is equal to the ordinary amortization of the balance of the savings and credits integrated into the Sciac account, because of a mathematical property of the amortization rate method, it is enough to calculate the ordinary amortization of the balance of the integrated savings and credits applying the same amortization rate method in order to obtain the same required result.

$$A_{N^k} = P\% \cdot B_{N^{k-1}} \tag{2}$$

This amortization method has the characteristic that for any cycle, the term to maturity and the profile for payments are identical for every savings and credit balance, as well as for the account balances into which they are integrated.

This characteristic allows the integration into a single account balance of several savings and credits carried out at different periods in time, for any amount, with different fixed or adjustable effective interest rates throughout their account terms, without losing the payment conditions of each savings and credit integrated into the account. The mathematical demonstration of this property is described in detail in Appendix 1.

For this integration, it is necessary that every effective savings and credit, belonging to the same Sciac account payment plan, be entered into the account balance expressed as an equivalent nominal value.

Extraordinary Amortizations

The Sciac account balance can also be amortized, partially or totally, by positive extraordinary amortizations, which are opposite financial transactions with regard to the balance, i.e. a savings transaction when there is a debt balance, and a credit transaction when there is a savings balance; which can be carried out together with and apart from the payment of an installment.

Any payment carried out, in addition to the payment of the ordinary installment, is a positive extraordinary amortization; which can be voluntary or as a consequence of the payment of a minimal, agreed, or compulsory installment.

The extraordinary amortization carried out in the payment of an installment is an effective savings or an effective credit financial transaction in cash money, depending on whether the installment is for a debt balance or for a savings balance. The effective savings or credit must be converted to an equivalent nominal savings or credit before being entered into the Sciac account balance. The counterpart of this financial transaction, the financial institution issuing the Sciac card as a special Sciac cardholder, fixes the effective interest rate of the operation according to the regulations and the Sciac account contract.

Any Sciac savings or credit financial transaction opposite in relation to the account balance, carried out with any other Sciac cardholder, apart from the payment of an installment, is also a positive extraordinary amortization. In this case, the transacted value can be cash money or any other value that the cardholder sells if he has a debt balance, or buys if he has a savings balance. In this case, both parties agree on the nominal and effective value of the transaction, taking into account the current effective interest rate.

Account Balances

The nominal account balance $B_{N^i}$ in every cycle "i" is equal to the nominal account balance $B_{N^{i-1}}$ of the previous cycle "i−1", minus the nominal amortization $A_{N^i}$ of the cycle "i", minus the total sum of nominal credits $C_{N_{i,j}}$ obtained and plus the total sum of nominal savings $S_{N_{i,j}}$ carried out within the same cycle "i".

$$B_{N^i} = B_{N^{i-1}} - A_{N^i} - \sum_{j=1}^{m} C_{N_{i,j}} + \sum_{j=m+1}^{n} S_{N_{i,j}} \tag{3}$$

$$B_{N^i} = B_{N^{i-1}} - P\% \cdot B_{N^{i-1}} - \sum_{j=1}^{m} C_{N_{i,j}} + \sum_{j=m+1}^{n} S_{N_{i,j}} \tag{4}$$

$$B_{N^i} = (1 - P\%) \cdot B_{N^{i-1}} - \sum_{j=1}^{m} C_{N_{i,j}} + \sum_{j=m+1}^{n} S_{N_{i,j}} \tag{5}$$

The previous formula remains as follows, changing $C_{N_{i,j}}$ and $S_{N_{i,j}}$ for $V_{N_{i,j}}$, which is common for both, but the credits have a minus symbol and the savings have a plus symbol.

$$B_{N^i} = (1 - P\%) \cdot B_{N^{i-1}} + \sum_{j=1}^{n} V_{N_{i,j}} \tag{6}$$

Every nominal savings and credit $V_{N_{i,j}}$ integrated into the Sciac account, due to the amortization rate method, has an "infinite term to maturity". However the balance of the Sciac account has an "indefinite term to maturity", because the debt or savings balance $B_{N^k}$ in any later cycle "k" can be fully paid with a nominal savings or credit $V_{N_{k,1}}$ for the same nominal value of the balance.

$$V_{N_{k,1}} = -B_{N^k} \tag{7}$$

This solution for the infinite term to maturity issue allows any account maturity date to be defined according to the regulations and the Sciac account contract. If the account maturity date is not renewed, the balance must at that time be liquidated with an opposite financial operation in relation to the balance. The account can also be closed at any time in the same manner, voluntarily by the cardholder or compulsorily by the financial institution.

Table 1 is an example of a Sciac account closure. In this case, the balance $B_N$ of the Sciac account, corresponding to the balance $B_{Na}$ of the credit $V_{Na}$ equal to 500, is liquidated in cycle 10 by the balance $B_{Nb}$ of the savings $V_{Nb}$ equal to 477,94.

TABLE 1

Example of a Sciac Account Closing

| P %<br>0.5% | Operation A<br>Credit: 500.00<br>in Cycle 1 | | Operation B<br>Savings: 477.94<br>in Cycle 10 | | Sciac<br>Account | |
|---|---|---|---|---|---|---|
| Cycle | $B_{Na}$ | $A_{Na}$ | $B_{Nb}$ | $A_{Nb}$ | $B_N$ | $A_N$ |
| 1 | −500.00 | 0.00 | 0.00 | 0.00 | −500.00 | 0.00 |
| 2 | −497.50 | 2.50 | 0.00 | 0.00 | −497.50 | 2.50 |
| 3 | −495.01 | 2.49 | 0.00 | 0.00 | −495.01 | 2.49 |
| 4 | −492.54 | 2.48 | 0.00 | 0.00 | −492.54 | 2.48 |
| 5 | −490.07 | 2.46 | 0.00 | 0.00 | −490.07 | 2.46 |
| 6 | −487.62 | 2.45 | 0.00 | 0.00 | −487.62 | 2.45 |
| 7 | −485.19 | 2.44 | 0.00 | 0.00 | −485.19 | 2.44 |
| 8 | −482.76 | 2.43 | 0.00 | 0.00 | −482.76 | 2.43 |
| 9 | −480.35 | 2.41 | 0.00 | 0.00 | −480.35 | 2.41 |
| 10 | −477.94 | 2.40 | 477.94 | 0.00 | 0.00 | 2.40 |
| 11 | −475.56 | 2.39 | 475.56 | −2.39 | 0.00 | 0.00 |
| 12 | −473.18 | 2.38 | 473.18 | −2.38 | 0.00 | 0.00 |

Interest

The nominal balance $B_{N_{i,j}}^{k-1}$ of a cycle "k−1" of each nominal savings and credit $V_{N_{i,j}}$ earns a nominal interest $I_{N_{i,j}}^{k}$ during the cycle "k". This interest is determined on the basis of a fixed or adjustable nominal interest rate $I_N^k$ % in the course of the infinite term to maturity.

$$I_{N_{i,j}}^{k}=I_N\% \cdot B_{N_{i,j}}^{k-1} \qquad (8)$$

The sum of nominal interest in any cycle "k" of all nominal savings and credits previously carried out, is equivalent to the nominal interest $I_N^k$ in that cycle "k", of all integrated nominal savings and credits. Such interest is calculated by multiplying the fixed or adjustable nominal interest rate $I_N^k$ % by the nominal balance $B_N^{k-1}$ of the previous cycle "k−1", of all integrated nominal savings and credits.

$$I_N^k = I_N^k\% \cdot B_N^{k-1} \qquad (9)$$

Installments

The installment can be ordinary or extraordinary. Any installment different to the ordinary installment is an extraordinary installment. Three special types of extraordinary installments are defined, these are: minimal, agreed and compulsory installments.

Ordinary Installments

The ordinary installment $D^k$ of any cycle "k" for the nominal balance $B_N^{k-1}$ of a previous cycle "k−1", of all integrated nominal savings and credits, is calculated as the sum of the amortization rate P % and the fixed or adjustable nominal interest rate $I_N^k$ % multiplied by the nominal balance $B_N^{k-1}$ of the previous cycle "k−1".

$$D^k = (P\% + I_N^k\%) \cdot B_N^{k-1} \qquad (10)$$

Extraordinary Installments

An extraordinary installment $eD^k$ for a debt balance or a savings balance, is any installment different to the ordinary installment $D^k$. In any given cycle "k", the extraordinary installment $eD^k$ is equal to the ordinary installment $D^k$ plus an effective extraordinary amortization $eA_E^k$. If the extraordinary installment is greater than the ordinary installment in absolute values, the extraordinary amortization is positive, which means the balance in absolute value diminished when the extraordinary amortization is applied after the ordinary amortization. Analogously, if the extraordinary installment is lower than the ordinary installment in absolute values, the extraordinary amortization is negative, which means the balance in absolute value increased when the extraordinary amortization is applied after the ordinary amortization.

$$eD^k = D^k + eA_E^k = (P\% + I_N^k\%) \cdot B_N^{k-1} + eA_E^K \qquad (11)$$

The paid positive extraordinary amortization is an effective savings or credit carried out in the case of a debt or savings balance respectively. The not paid negative extraordinary amortization is an effective credit or savings carried out in the case of a debt or savings balance respectively. The effective savings or credit financial transaction that is in cash money must be converted to an equivalent nominal savings or credit before being entered into the Sciac account balance. The counterpart of this financial transaction fixes the effective interest rate of the operation, depending on whether the extraordinary amortization was regular or irregular, according to the regulations and the Sciac account contract.

Irregular Negative Extraordinary Amortization

The positive extraordinary amortization is always regular. The negative extraordinary amortization is partially or totally irregular only if the payment of the installment for a debt balance is lower than the "lowest payment authorized" by the financial institution; the difference between the latter and the payment carried out would be the irregular part of the negative extraordinary amortization.

The irregular negative extraordinary amortization must be regularized by one or more of the following procedures: by obtaining an authorization by the financial institution for the irregularly acquired credit if the Sciac cardholder has enough guaranteed credit limit, by paying a compulsory extraordinary installment in the next cycle, by carrying out a savings transaction in cash money or selling any kind of value with the Sciac card, by reappraising or by providing more guarantees. If the Sciac account is not regularized within the term established in accordance with the regulations and the Sciac account contract, the financial institution will be authorized to liquidate the guarantees.

Minimal Installment

The financial institution fixes a minimal installment $|D_{min}|$ for every Sciac payment plan, to avoid the high operation costs of small installments. If the ordinary installment $|D^k|$ is lower than the minimal installment $|D_{min}|$, in absolute values, the installment must be for the minimal, be this a charge for a debt balance or a payment for a savings balance. The minimal installment paid in this case is an extraordinary installment which has a positive extraordinary amortization. By contract, the installment could also be zero to the payment of savings balance, in case it does not reach the minimal, in which case the extraordinary amortization is negative.

Compulsory Installment

The financial institution collects a compulsory installment, in accordance with the regulations and the Sciac account contract, when it is necessary to regularize the Sciac account in cases such as the following: a) If the "guaranteed credit limit" of a Sciac account for some reason become negative, having to be positive or zero, and b) If an irregular negative extraordinary amortization is generated, because the payment of an installment was lower than the "lowest payment authorized" by the financial institution. In both cases, the Sciac cardholder has more alternatives to regularize the Sciac account as mentioned in 2.1.5.3.

Agreed Installment

The financial institution can agree with the Sciac cardholder on a specific amount for the installment $|D_{agr}|$ or for the amortization $|_{agr}|$. For example uniform installments, for a determined term, for payments of either a debt or savings balance. If the agreed installment $|D_{agr}|$ is greater than the ordinary installment $|D^k|$, in absolute values, the Sciac cardholder carries out a positive extraordinary installment for the difference. If the situation is the contrary, he carries out a negative extraordinary amortization for the difference. If the payment of a debt balance is lower than the "lowest payment authorized" by the financial institution, the difference from the latter will be an irregular negative extraordinary amortization.

Transaction Formula of Savings and Credits

Nominal Value Equivalent Method

To integrate an effective savings or credit $V_{Ei,j}$ carried out with a fixed or adjustable effective interest rate $I_{Ei,j}$ %, different from the fixed or adjustable nominal interest rate $I_{N^i}$ % of the Sciac account payment plan, the equivalent nominal value method must be applied. This consists in the integration of the nominal value of the savings or credit $V_{Ni,j}$ into the account, equivalent to the effective value of the transaction $V_{Ei,j}$, which is the value of the good or service of the transaction when paid in cash.

The nominal value $V_{Ni,j}$ of the transaction can be calculated using the following formula, given the effective value $V_{Ei,j}$, the fixed or adjustable nominal interest rate $I_{N^i}$ %, the fixed or adjustable effective interest rate $I_{E^i,j}$ % and the amortization rate P %. This formula is demonstrated in Appendix 2.

$$V_{N_{i,j}} = V_{E_{i,j}} \cdot \frac{\left(P\% + I_{E_{i,j}^i}\%\right)}{(P\% + I_{N^i}\%)} \quad (12)$$

If P % and $I_{N^i}$ % add up to 1%, for example P %=0.5% and $I_{N^i}$ %=0.5% for a monthly payment cycle, the formula (12) is simpler. In this example, if $I_{Ei,j}$ %=0.6% and $V_{Ei,j}$=100, then $V_{Ni,j}$=110.

$$V_{N_{i,j}} = V_{E_{i,j}} \cdot (0.5\% + I_{E_{i,j}^i}\%) \cdot 100 \quad (13)$$

Table 2 is an example of savings and credit integration. In this case, we can see that the installment $D_N$ of the Sciac account in every cycle is equal to the installment of the credit $V_{Ea}$ added to the installment of the savings $V_{Eb}$. The effective interest $I_{Ea}$ and $I_b$ of both operations is calculated using their respective effective interest rates $I_{Ea}$ % and $I_{Eb}$ %.

TABLE 2

Example of Savings and Credit Integration in a Sciac Account

| | Operation A<br>Credit: 800 in Cycle | | | | Operation B<br>Savings: 500 in Cycle 6 | | | | $D_{Ea}$ | | Sciac Account | | | |
|---|---|---|---|---|---|---|---|---|---|---|---|---|---|---|
| | P % = 0.50%/$I_{Ea}$ % = 0.60% | | | | P % = 0.50%/$I_{Eb}$ % = 0.70% | | | | + | | P % = 0.50%   $I_N$ % = 0.50%(*) | | | |
| Cycle | $B_{Ea}$ | $A_{Ea}$ | $I_{Ea}$ | $D_{Ea}$ | $B_{Eb}$ | $A_{Eb}$ | $I_{Eb}$ | $D_{Eb}$ | $D_{Eb}$ | $V_N$ | $B_N$ | $A_N$ | $I_N$ | $D_N$ |
| 1 | −800.00 | 0.00 | 0.00 | 0.00 | | | | | | −880 | −880.00 | | | |
| 2 | −796.00 | −4.00 | −4.80 | −8.80 | | | | | −8.80 | | −875.60 | −4.40 | −4.40 | −8.80 |
| 3 | −792.02 | −3.98 | −4.78 | −8.76 | | | | | −8.76 | | −871.22 | −4.38 | −4.38 | −8.76 |
| 4 | −788.06 | −3.96 | −4.75 | −8.71 | | | | | −8.71 | | −866.87 | −4.36 | −4.36 | −8.71 |
| 5 | −784.12 | −3.94 | −4.73 | −8.67 | | | | | −8.67 | | −862.53 | −4.33 | −4.33 | −8.67 |
| 6 | −780.20 | −3.92 | −4.70 | −8.63 | 500.00 | 0.00 | 0.00 | 0.00 | −8.63 | 600 | −258.22 | −4.31 | −4.31 | −8.63 |
| 7 | −776.30 | −3.90 | −4.68 | −8.58 | 497.50 | 2.50 | 3.50 | 6.00 | −2.58 | | −256.93 | −1.29 | −1.29 | −2.58 |
| 8 | −772.42 | −3.88 | −4.66 | −8.54 | 495.01 | 2.49 | 3.48 | 5.97 | −2.57 | | −255.64 | −1.28 | −1.28 | −2.57 |
| 9 | −768.55 | −3.86 | −4.63 | −8.50 | 492.54 | 2.48 | 3.47 | 5.94 | −2.56 | | −254.36 | −1.28 | −1.28 | −2.56 |
| 10 | −764.71 | −3.84 | −4.61 | −8.45 | 490.07 | 2.46 | 3.45 | 5.91 | −2.54 | | −253.09 | −1.27 | −1.27 | −2.54 |

(*)Fixed

Nominal Value at any Date

As the formula considers flows of financial transactions and payments only at the deadline of the cycle, if the transaction is carried out on any day within the cycle, its nominal value is entered into an auxiliary account at the date of the transaction and then transferred to the Sciac account when a new cycle starts.

If the transaction is carried out at a time "t" before the deadline of cycle, its nominal value should be adjusted to consider the effective interest rate at the time "t". With "c" being the payment cycle expressed in days, and "t" the time before the deadline of the cycle, also expressed in days, the formula that relates the nominal and effective value is the following:

$$V_{N_{i,j}} = V_{E_{i,j}} \cdot \left[1 + \frac{t}{c} \cdot I_{E_{i,j}^i}\%\right] \cdot \frac{\left(P\% + I_{E_{i,j}^i}\%\right)}{(P\% + I_{N^i}\%)} \quad (14)$$

This formula is based on the definition that the payment plan does not consider the payment of a nominal interest during the time "t" and that the payment date of the installment is the same as the deadline of the payment cycle, otherwise it is necessary to adjust this formula for its accuracy.

Adjustable Effective and Nominal Interest Rate

In the Sciac formula the adjustable effective interest rate in any cycle "k" is related to the adjustable nominal interest rate of the same cycle, in accordance with the following formula, which is explained in Appendix 2:

$$I_{E_{i,j}^k}\% = \frac{V_{N_{i,j}}}{V_{E_{i,j}}} \cdot (I_{N^k}\% - I_{N^i}\%) + I_{E_{i,j}^i}\% \quad (15)$$

Effective and Nominal Interest Difference

Although the effective and nominal installments are equal in the same period by definition of the Sciac formula itself, the proportion between amortization and interest is different. This difference is not important in most cases, but it may matter for certain organizations or individuals, due to accounting and tax reasons.

As demonstrated in Appendix 3, the difference between the effective interest and the nominal interest in any cycle "k" is equal to the amortization of the balance of the difference between the nominal and effective values in the same cycle "k". This relation is valid for each savings and credit transaction and is also valid for savings and credit transactions integrated into a single account.

$$I_{E_{i,j}^k}\% \cdot B_{E_{i,j}^{k-1}} - I_{N^k} \cdot B_{N_{i,j}^{k-1}} = P\% \cdot B_{(N-E)_{i,j}^{k-1}} \quad (16)$$

$$B_{(N-E)_{i,j}^{k-1}} = (1-P\%)^{k-i-1} \cdot (V_{N_{i,j}} - V_{E_{i,j}}) \quad (17)$$

$$\sum_{i=1}^{i=k-1} \sum_{j=1}^{j=ni} \left( I_{E_{i,j}^k}\% \cdot B_{E_{i,j}^{k-1}} - I_{N^k}\% \cdot B_{N_{i,j}^{k-1}} \right) = P\% \cdot B_{(N-E)^{k-1}} \quad (18)$$

To calculate in any period, the difference between the effective interest and the nominal interest paid, the Sciac system maintains a parallel Sciac account balance with the difference between the nominal value and the effective value of each savings and credit transaction carried out, considering an official effective interest rate of the market.

Table 3 is an example that shows that the calculation of the difference between the effective and nominal interest by the calculation of the amortization of the balance of the difference between the effective and nominal values is consistent with the sum of the effective interest of each separate operation.

Sciac System

Components of the Sciac System

The Sciac system has the same components as any credit card system. The Sciac account, the Sciac card and the Sciac voucher are the elements of the financial instrument. The Sciac cardholders are the users of this financial instrument. The financial institutions associated to Sciac are the issuers of the Sciac card. The Sciac service centers are the administrators of the Sciac system.

Sciac Account

The Sciac account is the record that maintains a balance with all savings, credits, amortizations and other charges carried out which correspond to a Sciac cardholder in an associated financial institution. The Sciac account operation is carried out in accordance with the regulations of the financial instrument and the Sciac account contract signed between the Sciac cardholder and the financial institution.

Each Sciac account belongs to a payment plan. If P % is low, the account payment plan is a long-term plan (the lowest P % could be 0%); if P % is high, the account payment plan is a short-term plan (the highest P % could be 100%).

TABLE 4

Example of Different Kinds of Sciac Account Plans

| | Account Term | Medium Term | Long Term | Long Term |
|---|---|---|---|---|
| P % | Amortization Rate | 5.00% | 0.50% | 0.50% |
| $I_N$ % | Nominal Interest Rate | 1.00% | (*) | 0.50% |
| | Type of Interest Rate | Fixed | Adjustable | Fixed |
| c | Payment Cycle | Month | Month | Month |
| uv | Account Unit Value | Dollar | Dollar | Dollar |
| ai | Adjustment Index | No | No | CPI |

(*) the nominal interest rate is defined in each cycle

Sciac Card

The Sciac card is the document which contains the information of the Sciac account and of the Sciac cardholder, and is used to carry out savings and credit transactions. The Sciac card, as any credit card, has to be presented by the Sciac cardholder whenever he intends to obtain a Sciac credit,

TABLE 3

Example of Calculation of the Difference between Effective and Nominal Interest

| | Operation A Credit: 800 in Cycle 1 P % = 0.5% $I_{Ea1}$ % = 0.6% | | | | Operation B Savings: 500 in Cycle 6 P % = 0.5% $I_{Eb6}$ % = 0.7% | | | | $I_E$ | Sciac Account P % = 0.5% $I_{N1}$ % = 0.5% Adjustable | | | | Interest Difference Calculation | | |
|---|---|---|---|---|---|---|---|---|---|---|---|---|---|---|---|---|
| Cycle | $B_{Ea}$ | $A_{Ea}$ | $I_{Ea}$ | $I_{Ea}$ % | $B_{Eb}$ | $A_{Eb}$ | $I_{Eb}$ | $I_{Eb}$ % | $I_{Ea} + I_{Eb}$ | $B_N$ | $A_N$ | $I_N$ | $I_N$ % | $B_{(N-E)}$ | $A_{(N-E)}$ | $I_E - I_N$ |
| 0 | | | | | | | | | | | | | | | | |
| 1 | −800.00 | | | 0.60% | | | | | | −880.00 | | | 0.50% | −80.00 | | |
| 2 | −796.00 | 4.00 | 4.98 | 0.62% | | | | | 4.98 | −875.60 | 4.40 | 4.58 | 0.52% | −79.60 | 0.400 | 0.400 |
| 3 | −792.02 | 3.98 | 5.21 | 0.66% | | | | | 5.21 | −871.22 | 4.38 | 4.82 | 0.55% | −79.20 | 0.398 | 0.398 |
| 4 | −788.06 | 3.96 | 5.27 | 0.67% | | | | | 5.27 | −866.87 | 4.36 | 4.88 | 0.56% | −78.81 | 0.396 | 0.396 |
| 5 | −784.12 | 3.94 | 5.34 | 0.68% | | | | | 5.34 | −862.53 | 4.33 | 4.94 | 0.57% | −78.41 | 0.394 | 0.394 |
| 6 | −780.20 | 3.92 | 5.65 | 0.72% | 500.00 | | | 0.70% | 5.65 | −317.68 | 4.31 | 5.26 | 0.61% | −37.48 | 0.392 | 0.392 |
| 7 | −776.30 | 3.90 | 5.54 | 0.71% | 497.50 | −2.50 | −3.45 | 0.69% | 2.09 | −316.09 | 1.59 | 1.91 | 0.60% | −37.29 | 0.187 | 0.187 |
| 8 | −772.42 | 3.88 | 5.34 | 0.69% | 495.01 | −2.49 | −3.32 | 0.67% | 2.02 | −314.51 | 1.58 | 1.83 | 0.58% | −37.11 | 0.186 | 0.186 |
| 9 | −768.55 | 3.86 | 5.14 | 0.67% | 492.54 | −2.48 | −3.20 | 0.65% | 1.95 | −312.94 | 1.57 | 1.76 | 0.56% | −36.92 | 0.186 | 0.186 |
| 10 | −764.71 | 3.84 | 4.95 | 0.64% | 490.07 | −2.46 | −3.08 | 0.62% | 1.87 | −311.37 | 1.56 | 1.69 | 0.54% | −36.74 | 0.185 | 0.185 |
| 11 | −760.89 | 3.82 | 4.76 | 0.62% | 487.62 | −2.45 | −2.95 | 0.60% | 1.80 | −309.82 | 1.56 | 1.62 | 0.52% | −36.55 | 0.184 | 0.184 |

Credit $V_{Ea1}$ = 800 equivalent to $V_{N1}$ = 880.00 in Cycle 1
Savings $V_{Eb6}$ = 500 equivalent to $V_{N6}$ = 540.54 in Cycle 6 except when it is a computer transaction, in such case the card information must be entered and validated through at least a secret password. The basic information of the Sciac card is its account number, the name and signature of the cardholder or authorized user, the issuing financial institution, and its expiry date.

Sciac Voucher

The Sciac voucher is the financial document that records savings and credit operations when used as a value in a transaction between Sciac cardholders, and which is not endorsable. Once the Sciac voucher is deposited and its validity verified, it is an order to the issuing financial institutions of Sciac accounts participating in the transaction, to charge to the drawer's account and to credit to the taker's account the nominal value of the transaction.

The basic information to be registered in the Sciac voucher is: the drawer's Sciac account number, his name and signature (with ink or electronic); the taker's Sciac account number and his name; the Sciac payment plan; the date and the nominal value of the transaction. There can be different kinds of Sciac vouchers, such as: (a) the common Sciac voucher that is filled out while the Sciac cardholder carries out the financial transaction, at the same time as the buying and selling operation; (b) the special pre-valued voucher, which is filled out with transaction information by the financial institution previous to the closing of the buying and selling operation; and (c) the standard pre-valued voucher, which has a fixed standard value for different amounts, filled out by the financial institution with the drawer's transaction information.

The system allows financial transactions between one or more taker's accounts and one or more drawer's accounts. In this case, on the Sciac voucher, the nominal value of the transaction has to be indicated separately for each account, and the sum of all the amounts of the takers' Sciac accounts must be equal to the sum of all the amounts of the drawers' Sciac accounts.

Sciac Cardholders

The Sciac cardholder can be any person, individual (natural person) or organization (juridical person), and can hold one or more Sciac accounts of long, medium and short-term payment plan.

Figure 2:
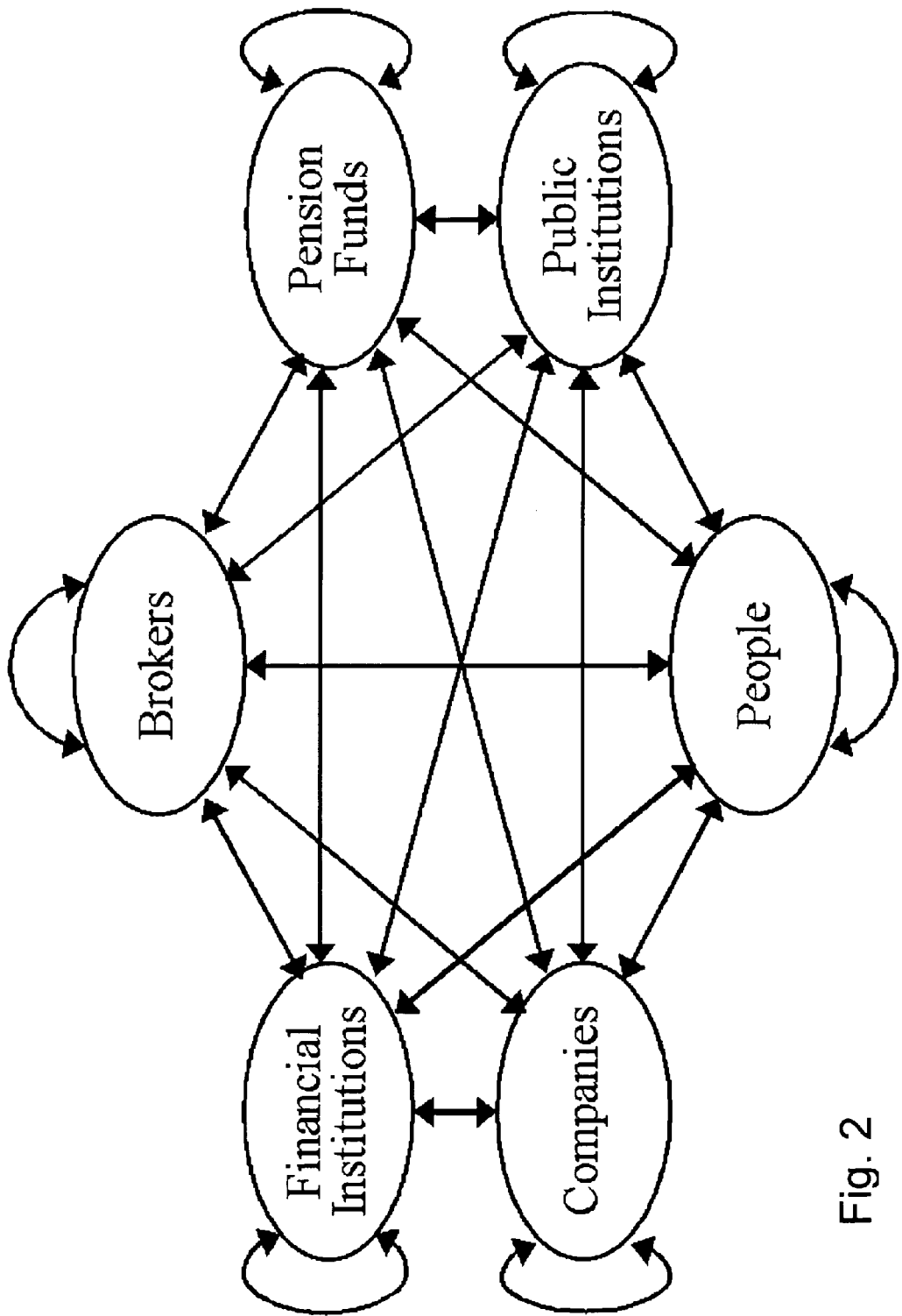
FIG. 2 is a diagram that illustrates some of the financial account cardholders and financial institutions that may use the accounts set forth herein.

Any type of institution or company can be a Sciac cardholder, including financial institutions, savings and loan associations and insurance companies; pension, mutual and investment fund institutions; stocks, commodities, securities and real estate brokers; auction institutions; industrial, commercial, agricultural, mining and utilities companies; trader and dealer companies; educational and health institutions; public and government institutions, etc. FIG. 2 is a diagram that illustrates some of the financial account cardholders and financial institutions that may use the accounts set forth herein.

Sciac Administrators

The Sciac system is managed in a similar way to an international credit card, through a local, regional, country and international Sciac card service centers network, which serve the Sciac cardholders and Sciac associated financial institutions.

The Sciac associated financial institutions are responsible for the payment of savings balance installments, which they must guarantee by insurance, collateral and contingency reserves.

The Sciac service centers by contract will maintain a strict control over the financial institutions associated to Sciac, as much in guarantees that they have to give, as insurance that they have to take and as in reserves that they have to have in order to assure the payment of the Sciac account savings balance. They will also maintain a strict control over the quality of the guarantees, available credit limit, guaranteed credit limit, payment capacity credit limit and insurance of Sciac account debtors.

Sciac Transactions

Sciac Financial and Payment Transactions

The Sciac account payment plan of the drawer and the taker in a financial transaction have to be the same.

A Sciac cardholder can buy and sell any kind of value with a Sciac card, money or any sort of good, service and security. The Sciac cardholder who buys a value with the Sciac card is obtaining a credit, and the Sciac cardholder who sells a value with the Sciac card is carrying out savings.

When the exchange value is cash money, the effective value is known, therefore the nominal value of the transaction can be calculated considering the ongoing market effective interest rate. In other cases, the effective value of the exchange value is a matter of agreement between the seller and the buyer. One option is to agree on the effective value beforehand, then to determine the nominal value of the transaction. The other option is to agree directly on the nominal value of the exchange value.

Figure 3:
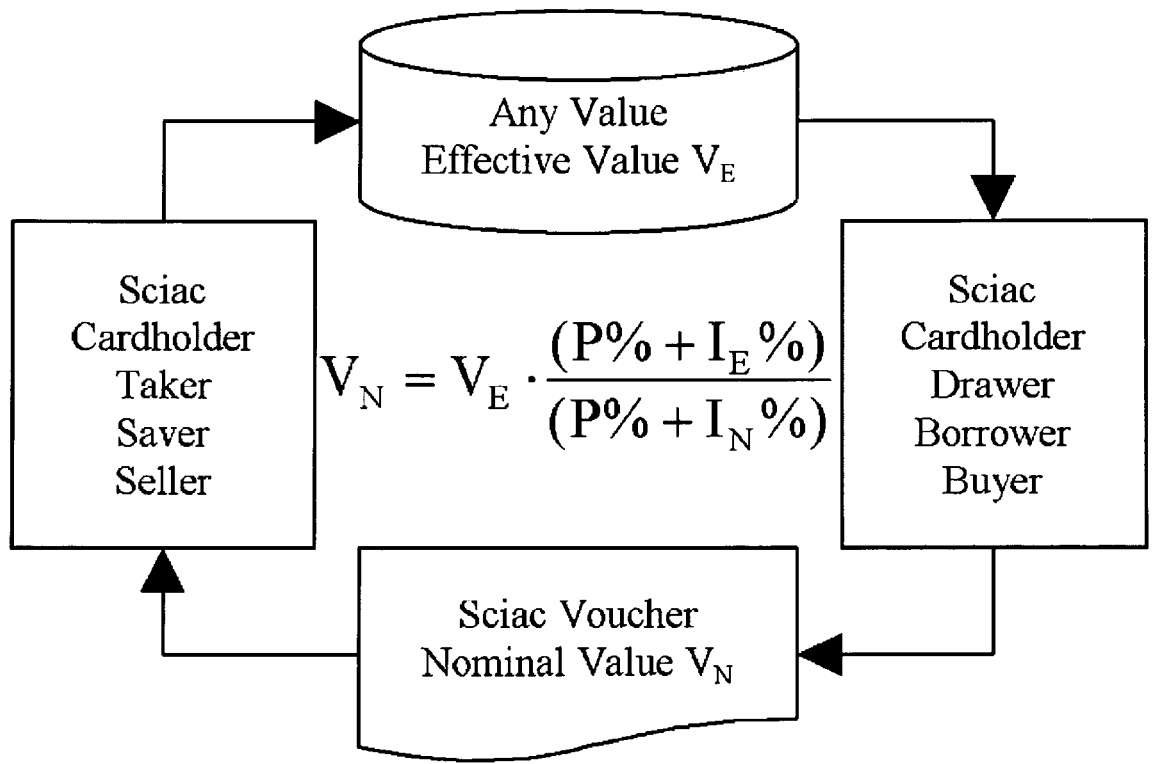
FIG. 3 shows a scheme of a typical transaction with a financial account card in accordance with one embodiment.

FIG. 3 shows a scheme of a typical transaction with a Sciac card.

For reasons of the financial equilibrium of the system, the nominal value of savings and credit transactions carried out with Sciac cards, must be agreed upon between the Sciac cardholders involved, for which they would have to consider the current effective interest rate of the financial market for the Sciac account payment plan, as well as the effective value or cash value of the good, service or security that is being exchanged.

Sciac Account Balances after Transaction

Figure 4:
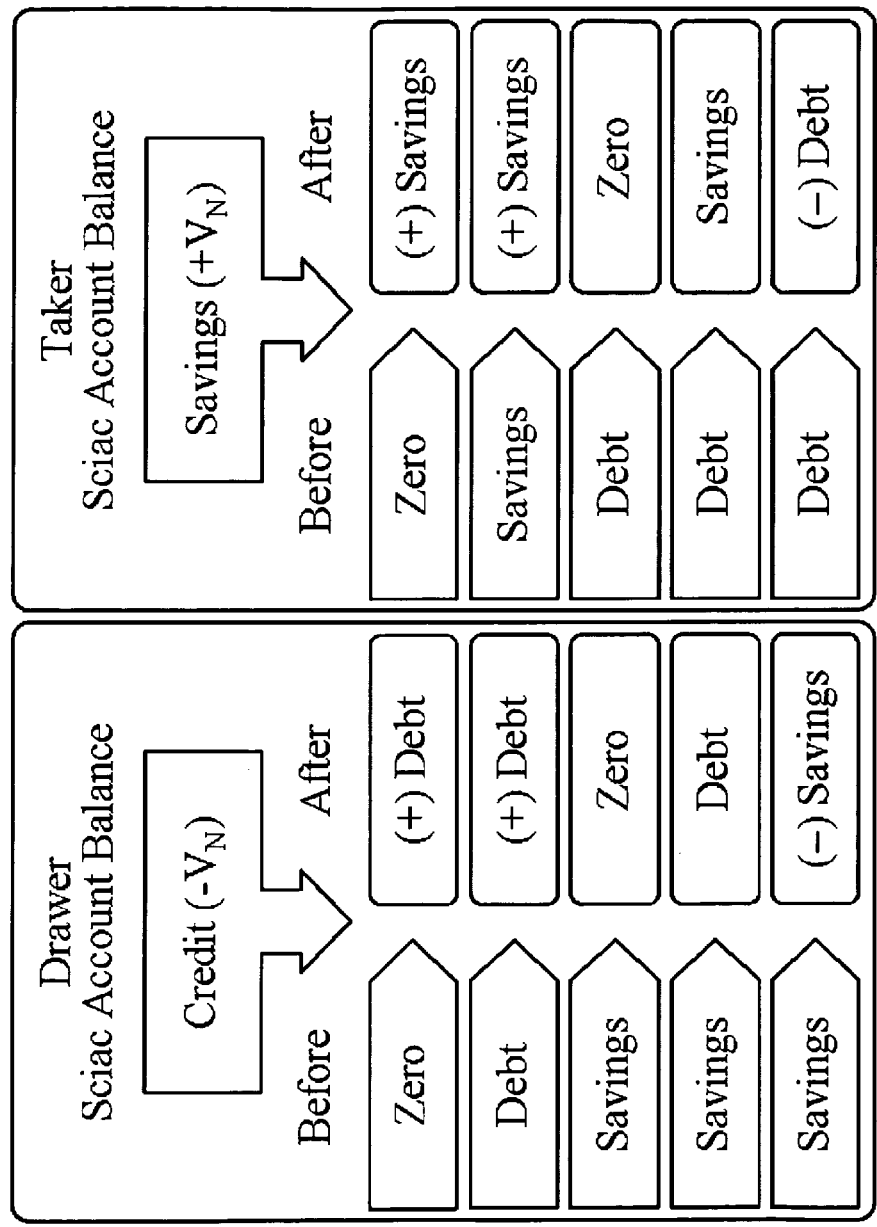
FIG. 4 illustrates how an account balance may change from zero to savings, from savings to more savings, from debt to zero, from debt to savings, or from debt to less debt.

The drawer's and the taker's Sciac account balances change after each operation according to the nominal value of the transaction and the previous balances. The drawer's Sciac account balance may change from zero to debt, from debt to more debt, from savings to zero, from savings to debt, from savings to less savings. On the other hand, the taker's Sciac account balance may change from zero to savings, from savings to more savings, from debt to zero, from debt to savings, or from debt to less debt, as shown in FIG. 4.

Sciac Transactions Between Different Payment Plans

The drawer and taker of a Sciac voucher in a transaction, have to use the same Sciac account payment plan. However, it is possible to carry out a Sciac financial transaction between Sciac accounts from different payment plans. In this case, it is necessary to carry out two simultaneous Sciac financial transactions, one between the drawer and his financial institution as taker, and the other between the taker and his financial institution as drawer. If the financial institution is different in each operation, an additional financial transaction would be required out between them. In this operation, any Sciac cardholder as an investor, such as a pension fund institution or an insurance company, can carry out the intermediary role of the financial institution.

Operations Between Sciac Account in Different Financial Institutions

Figure 5:
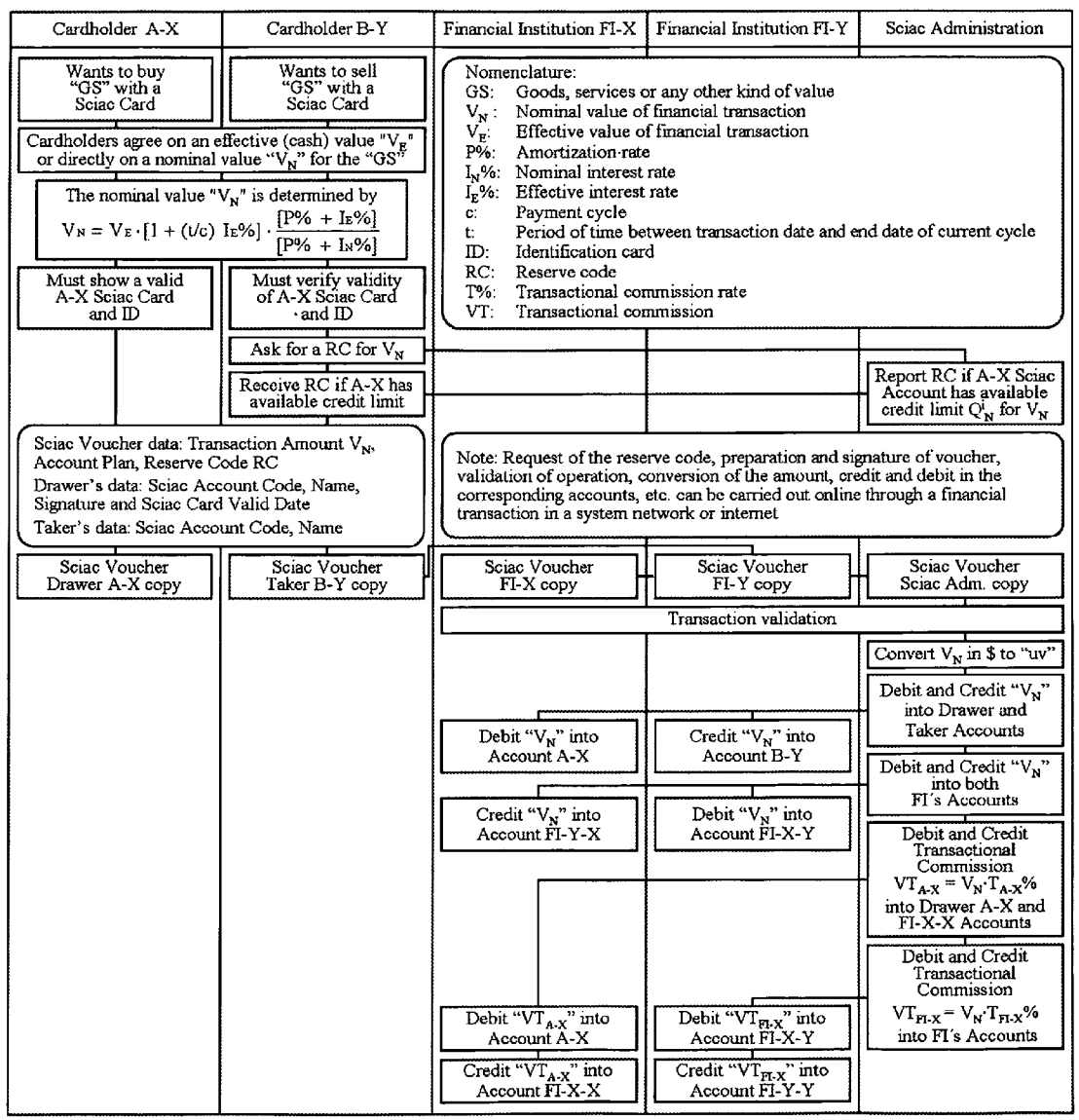
FIG. 5 illustrates how a transaction can be counterbalanced directly by open accounts pertaining to different financial institutions involved in a transaction, in accordance with one embodiment of the invention.

Sciac cardholders from different financial institutions can carry out Sciac financial transactions between themselves. In these cases, a clearing house can operate to balance the transactions using clearing accounts between the financial institutions involved, or alternatively, the transaction can be counterbalanced directly by the open Sciac accounts of those financial institutions in the corresponding financial institutions involved in the transaction. This latter option is developed in FIG. 5, for an operation between Sciac accounts open in two different financial institutions.

The financial institutions need to agree before hand on commission, considering their reciprocal risk estimates, in order to carry out savings and credit transactions between themselves.

Guarantees and Debt Control

The Sciac cardholder can obtain a credit, if he has enough "available credit limit" in the Sciac account. The "available credit limit" is the lowest between the "guaranteed credit limit" and the "payment capacity credit limit". The "guaranteed credit limit" is determined for each Sciac account as a function of: a) the total sum of the values of the guarantees given to the financial institution for Sciac accounts, in the current as well as future cycles, considering their respective depreciations in accordance with their nature, b) the total sum of the Sciac account balances, the auxiliary Sciac account balances, and the balances of the credit reserve currently in process, as well as in the current and future cycles, considering ordinary amortizations, and c) the total sum of Sciac vouchers drawn in guarantee. The "payment capacity credit limit" is determined considering the Sciac cardholder's payment capacity at the time of the credit and in the future, less the obligations that the Sciac cardholder must meet at that same time.

Sciac accepts all kinds of guarantees commonly accepted by the financial system, particularly real estate mortgage for credits in long-term Sciac account payment plan.

If the "guaranteed credit limit" becomes negative for any reason, by agreement, the Sciac cardholder should carry out one or more of the following operations: a) save cash money in the Sciac account through a compulsory extraordinary installment or a Sciac savings transaction, b) sell any value with the Sciac card, c) reappraise the guarantees at a higher value, or d) issue new guarantees.

The sum of all these operations should be an amount equal to or greater than the negative value of the "guaranteed credit limit". Otherwise, the financial institution must start the process of liquidation of guarantees, according to the regulations and the Sciac account contract. In the liquidation sale, the guarantees may be optionally paid for with the Sciac card.

To facilitate and assure a high effectiveness in the payment of the installments, the Sciac contracts will authorize the financial institution to charge or credit the installment, of a debt or a savings balance, in the cardholder's checking account open in the same financial institutions.

In the case of a debt balance, if the Sciac cardholder does not repay the installment before or on the due date, repays less, or repays after the due date, the unpaid installment related to the ordinary installment should be financed by the financial institution, being obliged to give a Sciac credit on the due date. The financed amount will be an effective savings for the financial institution and an effective credit for the Sciac cardholder who did not pay, which must be converted to an equivalent nominal savings and credit, to be credited and charged to the corresponding Sciac account. The financial institution will apply an effective interest rate and a commission defined for these operations in accordance with the regulations and the Sciac account contract. If the payment carried out or the non-payment of the installment, generates an irregular negative extraordinary amortization, the regularization procedure explained in point 2.1.5.3 must be followed.

In the case of a savings balance, if the cardholder does not withdraw the installment available to pay in the financial institution before the due date of the following cycle, and if an order to credit the installments to the checking account of the Sciac cardholder does not exist, the installment, depending on the Sciac account contract, will remain deposited in a special account until its withdrawal or will be considered as a voluntary savings carried out on the day immediately following the due date. The savings amount will be effective savings for the Sciac cardholder, who did not withdraw the installment, and an effective credit for the financial institution, which must be converted to equivalent nominal savings and credit, to be credited and charged to the corresponding Sciac account. The financial institution will apply an effective interest rate defined for these operations in accordance with the regulations and the Sciac account contract.

Commissions of the Sciac Card

As this financial instrument is symmetrical for savings and credits, the nominal interest rate $I_{N^i}$ % is the same for savings and credits of the Sciac accounts of the same payment plan. Due to this, competitive commission instead of spread is charged in the Sciac system in order to pay operational expenses and losses, to amortize investment and to obtain profits, for the financial institutions as well as for the Sciac card service centers.

Several kinds of commissions can be defined in the Sciac, one of them recommended to be applied is the "transaction commission". This consists in charging as commission a percentage T % of the nominal value of the transaction, that is only applied to whoever is obtaining the credit. This commission is charged as a Sciac credit into the drawer Sciac account and is credited as a Sciac savings to the financial institution. Therefore, it is paid by the drawer and is charged by the financial institution according to the Sciac account payment plan.

The percentage of the transaction commission would be freely defined by the financial institution. The definition will depend on the amount of the transaction, the quality of the client, the quality of the guarantees, the "available margin of previously paid commissions", if the credit is on a debt or on a savings balance, the commission strategy of the financial institution, or other factors.

This kind of commission gives the financial institution more stability in order to finance the system and facilitates the Sciac cardholders the analysis of the credit cost using the following formula:

$$V_{N_{i,j}} = V_{E_{i,j}} \cdot \frac{\left(P\% + I_{E_{i,j}}\%\right)}{(P\% + I_{N_i}\%)} \cdot (1 + T\%) \tag{19}$$

Due to the fact that the amount of the credit is higher with the commission, this higher amount must be compared with the "available credit limit" to obtain its authorization.

Installment Payment System

Multiple Accounts Installments Payment

The Sciac system allows every Sciac cardholder to hold more than one account belonging to different payment plans, which can be long, medium and short-term.

In every payment cycle, the system calculates an installment for each account that is collected or paid, depending on the account balance, debt or savings. When the cardholder has more than one account, the system gives notice of the installment for each account, and of an integrated installment, with the sum of all installments. This sum can be a value to be collected or paid, depending on the value of the installments. This integrated installment allows the cardholder to receive or make payment in a single installment.

When the cardholder pays a lower amount than the integrated installment or does not pay, the financial institution is obliged to give an effective Sciac credit for the difference not paid related to the ordinary installment integrated, which must be converted to one or more nominal Sciac credits according to the distribution of credit amount in the different Sciac accounts. These nominal Sciac credits are charged to Sciac accounts as indicated by the Sciac cardholder or by default according to the regulations and the Sciac account contract.

If the amount of credit generated irregular negative extraordinary amortizations or the "guaranteed credit limit" was exceeded, the financial institution according to the regulations and the Sciac account contract, will apply the exceptional procedures to regularize the Sciac accounts and to liquidate guarantees if necessary.

In the case that the Sciac cardholder pays an amount greater than the integrated installment, the financial institution will take out a Sciac savings to him for the amount over the ordinary integrated installment, which will be credited to the Sciac accounts as indicated by the Sciac cardholder or by default according to the regulations and the Sciac account contract. The financial institution will apply the effective interest rate defined for the Sciac account.

Installment Payment Date

The Sciac card as a financial instrument considers that all installment payments are carried out at the deadline of the cycle, as much for installments of debt as for installments of savings. Nevertheless the financial institution can agree on different payment dates with the Sciac cardholder, for the last payment date for installments from debt balances, as well as for the first payment date for installments of savings balances. In any case, the financial institutions must finance any difference between the real payment date and the deadline of the corresponding payment cycle, collecting and paying the corresponding interest to the Sciac cardholders for the difference of days.

Opening and Closing of Sciac Account Payment Plans

Opening of a Sciac Account Payment Plan

Different long, medium and short-term Sciac account payment plans will be able to be defined by the Sciac service centers, who will consider the interests of the financial institutions associated to Sciac, the demands of the market and the domestic or international regulations in force. These plans will be able to be freely opened or closed by associated financial institutions according to an agreement and, if necessary, with the approval of state regulatory institutions.

Closing of a Sciac Account Payment Plan

The payment plan can be closed by an associated financial institution or in some cases by a Sciac service center.

To close a payment plan in a financial institution it is necessary to liquidate all the account balances in that financial institution, for which the following general procedure has been considered: a) communicate to all Sciac cardholders that said payment plan will be closed for the increasing of debt balances or savings balances, b) offer all Sciac cardholders the option to change their debts or savings in the Sciac account belonging to the payment plan "Po", which will be closed, to an equivalent debt or savings in other Sciac account belonging to another similar payment plan "Pn". For this purpose, the financial institutions will have the following formula available, which relates the balance of the new payment plan to that of the closed payment plan.

$$B_{N_{Pn}} = B_{N_{Po}} \frac{(P_{Pn}\% + I_{N_{Pn}}\%) \cdot (P_{Po}\% + I_{E_{Po}}\%)}{(P_{Pn}\% + I_{E_{Pn}}\%) \cdot (P_{Po}\% + I_{N_{Po}}\%)} \quad (20)$$

Reserve Code and Sciac Voucher as Guarantee

The reserve code system is a mechanism to guarantee to the Sciac cardholder, who is selling in a financial transaction, that the Sciac cardholder who is buying in the same financial transaction, has enough "available credit limit" for the operation until it is completed. This mechanism consists in temporarily reducing the "available credit limit" by the amount of the transaction, from the moment the reserve code is solicited until the operation is completed. The "available credit limit" is automatically restored by the financial institution after a defined time or when the operation is canceled by an order.

The Sciac voucher could be used as guarantee if it is agreed by the Sciac cardholders in a transaction. In this case the value of the Sciac voucher is kept in a special account for guarantees that reduces the "available credit limit" of the drawer cardholder by the amount of the guarantee. The guarantee will be executed as a financial transaction, if any condition to the execution of the guarantee is fulfilled, which will be certified according to the agreement of the parties. The financial institution will charge a special commission for this operation.

Services and Mechanisms of the Sciac System

The Sciac system manages the Sciac card financial instrument using a computer system, through which savings and credit transactions between Sciac cardholders are carried out, Sciac account balances are maintained, installments from debt and savings balances are calculated, and other financial and payment services are provided.

Financial and Payment Services of the Sciac System

The computer system considers all kinds of financial and payment services, such as:

(1) Opening of Sciac accounts.

(2) Management of Sciac cardholders information.

(3) Management of information of Sciac associated financial institutions.

(4) Savings and credit financial transactions with Sciac card.

(5) Buying and selling transactions with Sciac cards.

(6) Calculation of the nominal value and the effective value of a transaction, with and without commission.

(7) Calculation of difference between the effective interest and the nominal interest.

(8) Management of Sciac accounts, including calculation of balances, amortizations, interest and commissions.

(9) Management of auxiliary Sciac accounts, with savings and credit carried out on any day within the current cycle.

(10) Determination of ordinary and extraordinary installments of Sciac accounts, including minimal, agreed and compulsory installments.

(11) Receipt of the installment payment, including installment payments of multiple accounts, and calculation of the paid positive and negative extraordinary amortization for each Sciac account.

(12) Management of commission between Sciac cardholders and Sciac associated financial institutions and Sciac service centers.

(13) Management of quality and risk of the Sciac cardholders and the financial institutions associated to Sciac.

(14) Management of operations between Sciac associated financial institutions and Sciac service centers.

(15) Calculation and reporting of the available credit limit, guaranteed credit limit, payment capacity credit limit, lowest payment authorized, and irregular negative extraordinary amortization.

(16) Management of reserves of available credit quota for Sciac transactions in process.

(17) Management of Sciac financial transactions with other financial instruments.

(18) Management of register and lifting operations of Sciac cardholders's guarantees, and transfer of guarantees between them.

(19) Management of appraisal and depreciation of guarantees, and auction operations of guarantees.

(20) Management of closure of Sciac accounts, voluntary and compulsory by contract.

(21) Management of Sciac vouchers as guarantee.

(22) Management of domestic and international financial transactions.

(23) Management of financial transactions between Sciac cardholders holding Sciac accounts in different financial institutions.

(24) Management of financial transactions between different payment plans.

(25) Management of contingency reserves to cover differences between payment of installments of savings and debt balances.

(26) Management of opening and closure of Sciac account payment plans.

The Sciac system also manages any kind of alliance with other products or services, such as:

(1) Co-branding with any product, service or company for discounts, gifts, free passes, and prizes for the use of the Sciac card.

(2) Agreement with any kind of company or institution to facilitate buying and selling transactions with the Sciac card through their web sites, pay phone terminals or other payment systems.

(3) Pension fund operations with Sciac in which the affiliates carry out savings in Sciac account instead of in a pension fund institution allowing such savings to be used to pay debts early but having a comprehensive credit limit control to ensure the capitalization of the Sciac card affiliates' funds.

(4) Operations of state subsidies for housing, health and welfare.

Mechanisms and Resources of the Sciac System

In the Sciac computer system, all types of communication mechanisms and resources for providing the financial services are considered, such as:

(1) Internet.
(2) Fixed and mobile phones.
(3) Fax.
(4) E-mail.
(5) Public and private communications networks, wired and wireless.

In the Sciac computer system, the use of the most appropriate software languages, operating systems and databases are considered in order to provide the financial services.

In the Sciac computer system all types of security mechanisms for carrying out financial transactions and all financial and payment services through the different communication systems mentioned are considered, such as:

(1) Password and second variable password such as the "digipass".
(2) E-mail check.
(3) Phone check.
(4) Double and triple check.
(5) Protection of information from hackers, viruses and such.
(6) Protection of information from physical damages.
(7) Biometric security system.

APPENDIX 1

Demonstration of the Sciac Formula for Savings and Credits Integration

Thesis

The amortization rate method has the mathematical property that allows the integration into a single Sciac account of effective savings and credits $V_{Ei,j}$, of a same payment plan, for any amount, carried out in any cycle, and agreed on with different fixed or adjustable effective interest rates $I_{E^i,j}$ %, expressed in an equivalent nominal values $V_{Ni,j}$ using a common fixed or adjustable nominal interest rate $I_{N^j}$ % without affecting the payment conditions of each effective savings and credit.

Note: "i" identifies the cycle when the savings or credit was carried out and "j" identifies different savings or credit transactions carried out within the same cycle "i".

This property is demonstrated mathematically if the sum of the ordinary installment $D_{E^k_{i,j}}$ of every effective savings and credits $V_{Ei,j}$, independently calculated for any cycle "k", greater than "i", is equal to the ordinary installment $D_{N^k}$ of the nominal balance $B_{N^{k-1}}$ of all nominal values equivalent to the savings and credits integrated into a single Sciac account $V_{Ni,j}$.

$$\sum_{i=1}^{i=k-1} \sum_{j=1}^{j=ni} D_{Ei,j}^k = D_N^k = (P\% + I_N^k\%) \cdot B_N^{k-1} \quad (1.1)$$

DEFINITIONS

The ordinary installment of an effective savings or credit in any cycle "k" is equal to the ordinary installment of the equivalent nominal savings or credit in the same cycle "k".

$$D_{E_{i,j}}^k = D_{N_{i,j}}^k \quad (1.2)$$

The ordinary installment of an effective savings or credit in any cycle "k" is equal to the balance of that effective savings or credit in the previous cycle "k−1" multiplied by the sum of the amortization rate P % and the effective interest rate $I_{E^k_{i,j}}$ %.

$$D_{E_{i,j}}^k = (P\% + I_{E_{i,j}}^k\%) \cdot B_{E_{i,j}}^{k-1} \quad (1.3)$$

The ordinary installment of a nominal savings or credit equivalent to an effective savings or credit in any cycle "k" is equal to the balance of that nominal savings or credit in the previous cycle "k−1" multiplied by the sum of the amortization rate P % and the fixed or adjustable nominal interest rate $I_{N^k}$ %.

$$D_{N_{i,j}}^k = (P\% + I_{N^k}\%) \cdot B_{N_{i,j}}^{k-1} \quad (1.4)$$

The nominal balance of a nominal savings or credit in the cycle "i" in which it was carried out, is equal to its respective nominal savings or credit.

$$B_{N_{i,j}}^i = V_{N_{i,j}} \quad (1.5)$$

The nominal balance of a nominal savings or credit in any cycle "k" is equal to the nominal balance of that nominal savings or credit in the previous cycle "k−1", minus the amortization from the nominal balance of the previous cycle "k−1".

$$B_{N_{i,j}}{}^k = (1-P\%) \cdot B_{N_{i,j}}{}^{k-1} \tag{1.6}$$

The Sciac account balance in the cycle "1" is equal to the sum of all nominal savings and credits carried out in the cycle "1" when the Sciac account was opened.

$$B_{N^1} = \sum_{j=1}^{j=n1} V_{N_{1,j}} \tag{1.7}$$

The Sciac account nominal balance in any cycle "k" is equal to the Sciac account nominal balance in the previous cycle "k−1", minus the amortization of the Sciac account balance in the previous cycle "k−1", plus the sum of all savings and credits carried out during that cycle "k".

$$B_N^k = (1-P\%) \cdot B_N^{k-1} + \sum_{j=1}^{j=nk} V_{N_{k,j}} \tag{1.8}$$

Demonstration

The sum of ordinary installments in any cycle "k" of effective savings and credits carried out in cycles previous to "k", is equal to the sum of ordinary installments of the equivalent nominal savings and credit in that same cycle "k". This equation is obtained from the definition (1.2).

$$\sum_{i=1}^{i=k-1} \sum_{j=1}^{j=ni} D_{E_{i,j}} = \sum_{i=1}^{i=k-1} \sum_{j=1}^{j=ni} D_{N_{i,j}^k} \tag{1.9}$$

The following equation is the result of the introduction of the definition (1.4) into the expression (1.9).

$$\sum_{i=1}^{i=k-1} \sum_{j=1}^{j=ni} D_{E_{i,j}^k} = (P\% + I_{N^k}\%) \cdot \sum_{i=1}^{i=k-1} \sum_{j=1}^{j=ni} B_{N_{i,j}^{k-1}} \tag{1.10}$$

The thesis demonstrated below proves first, by means of the mathematical induction method, that the Sciac account nominal balance in the "k−1" cycle $B_{N^{k-1}}$ is equal to the sum of all nominal balances in the same cycle "k−1" of all nominal savings and credits carried out before the cycle "k".

$$B_{N^{k-1}} = \sum_{i=1}^{i=k-1} \sum_{j=1}^{j=ni} B_{N_{i,j}^{k-1}} \tag{1.11}$$

Introducing the definition (1.5) for the cycle "1" in the definition (1.7), we have the following expression:

$$B_{N^1} = \sum_{j=1}^{j=n1} B_{N_{1,j}^1} \tag{1.12}$$

The definition (1.8) for the cycle "2" is:

$$B_{N^2} = (1-P\%) \cdot B_{N^1} + \sum_{j=1}^{j=n2} V_{N_{2,j}} \tag{1.13}$$

Replacing the expression (1.12) and the definition (1.5) for cycle "2" in the equation (1.13) we have the following expression:

$$B_{N^2} = (1-P\%) \times \sum_{j=1}^{j=n1} B_{N_{1,j}^1} + \sum_{j=1}^{j=n2} B_{N_{2,j}^2} \tag{1.14}$$

Replacing the definition (1.6) for cycle "2" in (1.14) we have the following expression:

$$B_{N^2} = \sum_{j=1}^{j=n1} B_{N_{1,j}^2} + \sum_{j=1}^{j=n2} B_{N_{2,j}^2} \tag{1.15}$$

The equation (1.11) is demonstrated, by means of mathematical induction method, repeating this last process until the cycle "k−1".

Finally, the thesis equation indicated in the formula (1.1) is demonstrated by introducing the equation (1.11) into the expression (1.10).

APPENDIX 2

Sciac Formula Demonstration of the Relationship Between Nominal and Effective Values Thesis The equivalent nominal value $V_{N_{i,j}}$, for a payment plan with a fixed or adjustable nominal interest rate $I_{N^i}$ %, an amortization rate P %, a unit value "uv" and a payment cycle "c", corresponding to an effective value $V_{E_{i,j}}$ of any savings or credit agreed on with the same payment plan but with a fixed or adjustable effective interest rate $I_{E^k_{i,j}}$ %, is the effective value $V_{E_{i,j}}$ multiplied by the sum of the amortization rate P % plus the fixed or adjustable effective interest rate $I_{E^i_{i,j}}$ % of the cycle "i", divided by the sum of the amortization rate P % plus the fixed or adjustable nominal interest rate $I_{N^i}$ % of the same cycle "i".

The subscript "i" identifies the cycle when a savings or credit is carried out, and "j" the savings or credit carried out in the same cycle "i".

$$V_{N_{i,j}} = V_{E_{i,j}} \cdot \frac{\left(P\% + I_{E^i_{i,j}}\%\right)}{(P\% + I_{N^i}\%)} \tag{2.1}$$

The same equivalence is valid for any other cycle "k" with a different adjustable nominal interest rate $I_{N^k}$ % and its corresponding adjustable effective interest rate $I_{E^k_{i,j}}$ %.

$$V_{N_{i,j}} = V_{E_{i,j}} \cdot \frac{\left(P\% + I_{E^k_{i,j}}\%\right)}{(P\% + I_{N^k}\%)} \tag{2.2}$$

DEFINITIONS

The definitions (1.2), (1.3), (1.4) and (1.5) from Appendix 1 and the following are considered.

The balance of an effective savings or credit in the cycle "i" in which it was carried out, is equal to the respective effective savings or credit.

$$B_{E_{i,j}}{}^i = V_{E_{i,j}} \tag{2.3}$$

The nominal balance of a nominal savings or credit in cycle "k−1", is equal to the nominal balance of that nominal savings or credit in the previous cycle "k−2" minus the amortization from the nominal balance of the previous cycle "k−2".

$$B_{N_{i,j}}{}^{k-1} = (1 - P\%) \cdot B_{N_{i,j}}{}^{k-2} \tag{2.4}$$

The effective balance of an effective savings or credit in cycle "k−1" is equal to the effective balance of that effective savings or credit in the previous cycle "k−2", minus the amortization from the effective balance of the previous cycle "k−2".

$$B_{E_{i,j}}{}^{k-1} = (1 - P\%) \cdot B_{E_{i,j}}{}^{k-2} \tag{2.5}$$

Demonstration

Introducing the definition (1.3) and (1.4) into (1.2) we have the following expression:

$$B_{N_{i,j}}{}^{k-1} \cdot (P\% + I_N{}^k\%) = B_{E_{i,j}}{}^{k-1} \cdot (P\% + I_{E_{i,j}}{}^k\%) \tag{2.6}$$

Introducing the definition (2.4) into the same definition (2.4) but for "k−2", "k−3", etc. up to "i", and analogously introducing the definition (2.5) into the same definition (2.5) but for "k−2", "k−3", etc. up to "i", we obtain:

$$B_{N_{i,j}}{}^{k-1} = (1 - P\%)^{k-1-1} \cdot B_{N_{i,j}}{}^{j} \tag{2.7}$$

$$B_{E_{i,j}}{}^{k-1} = (1 - P\%)^{k-i-1} \cdot B_{E_{i,j}}{}^{j} \tag{2.8}$$

Introducing the definition (1.5) into the equation (2.7) and the definition (2.3) into the equation (2.8), we obtain:

$$B_{N_{i,j}}{}^{k-1} = (1 - P\%)^{k-i-1} \cdot V_{N_{i,j}} \tag{2.9}$$

$$B_{E_{i,j}}{}^{k-1} = (1 - P\%)^{k-i-1} \cdot V_{E_{i,j}} \tag{2.10}$$

Introducing the expressions (2.9) and (2.10) into the equation (2.6), we have the following expression:

$$(1 - P\%)^{k-i-1} \cdot V_{N_{i,j}} \cdot (P\% + I_N{}^k\%) = (1 - P\%)^{k-i-1} \cdot V_{E_{i,j}} \cdot (P\% + I_{E_{i,j}}{}^k\%) \tag{2.11}$$

The formula (2.2) of the thesis is demonstrated by canceling the first term on both sides of the equation and reordering.

When a savings or credit is carried out with an adjustable nominal interest rate, the nominal and effective interest rates of the cycle "i" are only known and considered in the determination of the nominal value. Therefore, any future effective interest rate will depend on the nominal and effective interest rate of the cycle "i" in accordance with the following equation, which is deduced from the formulas (2.1) and (2.2) of this thesis:

$$I_{E_{i,j}}^k \% = \frac{V_N}{V_E} \cdot (I_N^k \% - I_N^i \%) + I_{E_{i,j}}^i \% \tag{2.12}$$

APPENDIX 3

Sciac Formula Demonstration of the Relationship Between Nominal and Effective Interest Thesis The difference between the effective interest $I_{Ei,j}{}^k$ and the nominal interest $I_{Ni,j}{}^k$ of any savings or credit in any cycle is equal to the amortization rate P % multiplied by the balance of the difference between the nominal and to effective values of that savings or credit in the same cycle.

The sum of all the differences between the effective interest and the nominal interest of each savings and credit in any cycle "k" is equal to the amortization rate P % multiplied by the balance of the sum of all the differences between the nominal and the effective values of each savings and credit.

$$I_{E_{i,j}}{}^k\% \cdot B_{E_{i,j}}{}^{k-1} - I_N{}^k\% \cdot B_{N_{i,j}}{}^{k-1} = P\% \cdot B_{(N-E)_{i,j}}{}^{k-1} \tag{3.1}$$

$$\sum_{i=1}^{i=k-1} \sum_{j=1}^{j=ni} \left( I_{E_{i,j}}^k \% \cdot B_{E_{i,j}}^{k-1} - I_N^k \% \cdot B_{N_{i,j}}^{k-1} \right) = P \% \cdot B_{(N-E)}^{k-1} \tag{3.2}$$

DEFINITIONS $$B_{E_{i,j}}{}^{k-1} = (1 - P\%)^{k-i-1} \cdot V_{E_{i,j}} \tag{3.3}$$

$$B_{N_{i,j}}{}^{k-1} = (1 - P\%)^{k-i-1} \cdot V_{N_{i,j}} \tag{3.4}$$

$$B_{(N-E)_{i,j}}{}^{k-1} = (1 - P\%)^{k-i-1} \cdot (V_{N_{i,j}} - V_{E_{i,j}}) \tag{3.5}$$

The expressions (3.3) and (3.4) are demonstrated in Appendix 2 in the equations (2.10) and (2.9) and the expression (3.5) is demonstrated analogously.

$$V_{N_{i,j}} \cdot (P\% + I_N{}^k\%) = V_{E_{i,j}} \cdot (P\% + I_{E_{i,j}}{}^k\%) \tag{3.6}$$

The expression (3.6) is demonstrated in Appendix 2.

Demonstration

Reordering the equation (3.6) we have the following expression:

$$I_{E_{i,j}}{}^k\% \cdot V_{E_{i,j}} - I_N{}^k\% \cdot V_{N_{i,j}} = P\% \cdot (V_{N_{i,j}} - V_{E_{i,j}}) \tag{3.7}$$

Multiplying both sides of the expression (3.7) by $(1 - P\%)^{k-i-1}$ we have:

$$I_E{}^k\% \cdot (1 - P\%)^{k-i-1} \cdot V_{E_{i,j}} - I_N{}^k\% \cdot (1 - P\%)^{k-i-1} \cdot V_{N_{i,j}} = P\% \cdot (1 - P\%)^{k-i-1} \cdot (V_{N_{i,j}} - V_{E_{i,j}}) \tag{3.8}$$

The formula (3.1) of the thesis is demonstrated by introducing the expressions (3.3), (3.4) and (3.5) into (3.8).

For the formula (3.2) of the thesis, we have the following expression adding the formula (3.1) for every savings and credit carried out:

$$\sum_{i=1}^{i=k-1} \sum_{j=1}^{j=ni} \left( I_{E_{i,j}}^k \% \cdot B_{E_{i,j}}^{k-1} - I_N^k \% \cdot B_{N_{i,j}}^{k-1} \right) = P \% \cdot \sum_{i=1}^{i=k-1} \sum_{j=1}^{j=ni} B_{(N-E)_{i,j}}^{k-1} \tag{3.9}$$

Applying the expression (1.11) demonstrated in Appendix 1, to the difference between the nominal and effective values of savings or credit, we have the expression (3.10).

$$B_{(N-E)}^{k-1} = \sum_{i=1}^{i=k-1} \sum_{j=1}^{j=ni} B_{(N-E)_{i,j}}^{k-1} \tag{3.10}$$

The formula (3.2) of this thesis is demonstrated by introducing the expression (3.10) into the equation (3.9).

What is claimed is:

1. A computer-implemented method comprising:

executing a plurality of operations on at least one computer, wherein the operations comprise:

associating each of a plurality of financial accounts with a financial account card, each account having a nominal interest rate and integrating both credit transactions and savings transactions of a same payment plan into a single account balance, wherein the transactions can be carried out at different times, for any agreed amount, with different fixed or adjustable effective interest, without losing payment conditions of each savings and credit transaction;

defining account payment plans that each have a fixed amortization rate, a fixed or adjustable nominal interest rate, a payment cycle, an account unit value, an adjustment index of value and an indicator of whether or not the nominal interest rate is proportionally applied in a first cycle, between the transaction date and the deadline of the cycle; wherein each account payment plan is considered long, medium, or short term depending on the amortization rate and the payment cycle defined in the account payment plan;

initiating simultaneous to savings and credit transactions a buying and selling transactions between two or more cardholders of two or more of the financial account cards, wherein a first accountholder is a buyer that obtains credit and a second accountholder is a seller that saves, wherein the buying and selling transactions must be done, directly or indirectly, between the two or more cardholders, and wherein the effective or cash value of the buying and selling transaction is integrated into the account balance of the drawer cardholder as a credit and into the account balance of the taker cardholder as a savings, in a nominal value financially equivalent, which is determined automatically in accordance with terms defined by of a financial institution or negotiated considering an effective market interest rate, a fixed or adjustable nominal interest rate, the amortization rate of the account payment plan, the payment cycle of the account payment plan, the time between the transaction date and the deadline of the cycle, and commissions;

storing, maintaining, and applying available credit limit data for each account, wherein the available credit limit data for each account depends on the account balances, every guarantees delivered and payment capacity of the accountholder; prior to integration of a credit or savings transaction into an account balance, keeping the credit or savings transaction in an auxiliary account that earns or does not earn interest depending on the account payment plan;

integrating a credit or savings transaction into the account balance in the next payment cycle deadline;

wherein a credit transaction creates or increases a debt balance, changes a savings balance to a debt balance, or diminishes or liquidates a savings balance;

wherein a savings transaction creates or increases a savings balance, changes a debt balance to a savings balance, or diminishes or liquidates a debt balance;

wherein a clearing account operates to balance transactions involving different financial institutions or to counterbalance directly by the open accounts of those financial institutions in the corresponding institutions involved in the transaction;

if different account payment plans are involved in a transaction, carrying out the transaction with facilitation by a computer by using one or more intermediary cardholders;

wherein each account balance, savings or debt, is ordinarily amortized, compulsorily and periodically, in each payment cycle, which is determined applying the fixed amortization rate defined in the account payment plan to the account balance of the previous cycle; and wherein each account balance, savings or debt, earns an interest in each payment cycle, which is determined by applying the fixed or adjustable nominal interest rate of the account payment plan to the account balance of the previous cycle;

wherein all effective value paid or not paid, over or under the ordinary installment, is converted to an equivalent nominal value before being integrated into the account balance; wherein this extraordinary amortization, positive or negative, is carried out when the cardholder pays or receives an installment, and wherein the other side of the savings and credit transaction is a financial institution as a cardholder.

2. The computer-implemented method of claim 1, wherein the operations further comprise generating a voucher to document a transaction.

3. The computer-implemented method of claim 1, wherein the operations further comprise managing guarantees to ensure the repayment of debt of all open accounts for the same cardholder; wherein the method uses depreciation to value the guarantees in a current or future cycle, calculates and controls the available credit limit, determines and maintains a value for lowest payment authorized by the financial institution, that the cardholder can pay for debt balances in each cycle; controls irregular debts; and provides information and facilitates the liquidation of the guarantees when the debts are not being paid.

4. The computer-implemented method of claim 1, wherein the operations further comprise using a plurality of devices to carry out financial services and to enter data and obtain information.

5. The computer-implemented method of claim 4, wherein the operations further comprise using security mechanisms including password, e-mail and phone check, and a biometric security system.

6. The computer-implemented method of claim 1, wherein the operations further comprise managing alliances of the financial card with other products, services, institutions, and companies.

7. A computer-implemented method comprising:

executing a plurality of operations on at least one computer, wherein the operations comprise:

associating data stored on each of a plurality of financial account cards with a financial account having a nominal interest rate and integrating both credit transactions and savings transactions into a same single payment plan, wherein the transactions may be for any agreed amount, occur at any time, and have any fixed or adjustable effective interest rate;

using at least two financial account cards of at least two cardholders to initiate a financial transaction that results in:

a credit transaction of a specified value and an explicit or implicit agreed fixed or adjustable effective interest rate being added to at least one of the accounts, wherein the agreed effective interest rate can be different from the nominal interest rate;

a credit transaction of an explicit or implicit nominal value being added to at least one of the accounts, wherein the nominal value is different to effective value or cash value of the transaction if the effective interest rate is different to the nominal interest rate defined in the account payment plan;

a savings transaction of a specified value and an explicit or implicit agreed fixed or adjustable effective interest rate being added to at least one of the accounts, wherein the agreed effective interest rate can be different from the nominal interest rate; and a savings transaction of an explicit or implicit nominal value being added to at least one of the accounts, wherein the nominal value is different to effective value or cash value of the transaction if the effective interest rate is different to the nominal interest rate defined in the account payment plan;

periodically calculating a single account balance for each account, wherein the calculation of the single account balance uses an amortization rate method in which a periodic ordinary amortization is calculated as a fixed percentage defined in a payment plan of a last account balance of the account; and using a nominal value equivalent method in which a nominal value equivalent of effective cash value of savings and credits are integrated into the account, wherein the calculation of the single account balance maintains individual payment conditions for each transaction.

8. The computer-implemented method of claim 7, wherein the credit transaction is initiated on a first account and the savings transaction is initiated on a second account.

9. The computer-implemented method of claim 8, wherein the first account corresponds to a buyer and the second account corresponds to a seller of at least one of a good, a service, money, or a security.

10. The computer-implemented method of claim 7, wherein only cardholders of the financial account cards can initiate transactions using the computer-implemented method directly or indirectly.

11. The computer-implemented method of claim 7, wherein the operations further comprise generating a voucher to document each transaction.

12. The computer-implemented method of claim 7, wherein the operations further comprise calculating a payment to be paid to at least one financial institution.

13. The computer-implemented method of claim 7, wherein the operations further comprise managing at least one guarantee associated with at least one of the financial account cards associated with an account having a different payment plan.

14. The computer-implemented method of claim 9, wherein the first account has a different payment plan from the second account, and wherein the first account pertains to a different financial institution than the second account.

15. The computer-implemented method of claim 7, wherein the operations further comprise changing the single account balance for an account by making a positive or negative extraordinary amortization.

16. The computer-implemented method of claim 15, wherein the extraordinary amortization made on an account comprises a compulsory extraordinary amortization that is made to correct an irregular condition that has occurred in the account.

17. The computer-implemented method of claim 15, wherein the extraordinary amortization made on an account comprises a minimal extraordinary amortization that is made to ensure payment of a minimal installment for the account when an ordinary installment is less than the minimal installment.

18. The computer-implemented method of claim 15, wherein the extraordinary amortization made on an account comprises an agreed extraordinary amortization that is made to ensure payment of an agreed-upon installment for the account when an ordinary installment differs from the agreed-upon installment.

19. The computer-implemented method of claim 7, wherein the operations further comprise performing an account closing transaction on an account comprising making an opposite financial transaction to the single balance of the account.

20. The computer-implemented method of claim 7, wherein the operations further comprise carrying out a transaction independent of a payment cycle deadline for an account by using an auxiliary account to accumulate savings and credits carried out between deadlines of the payment cycle.

* * * * *